INVENTOR.
ROBERT W. BRUNDAGE
BY
Meyer, Tilberry & Body
ATTORNEYS

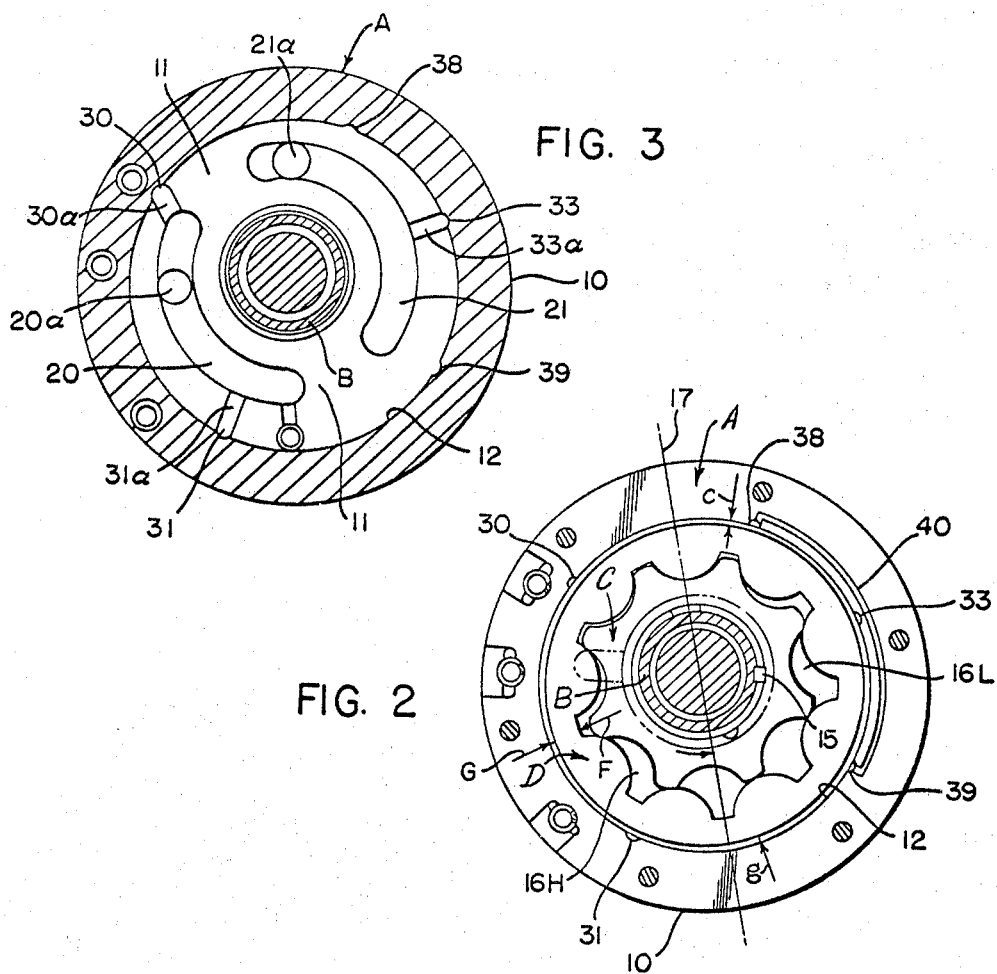

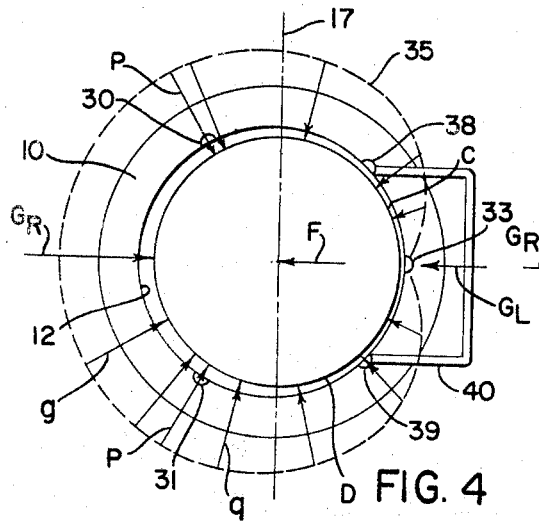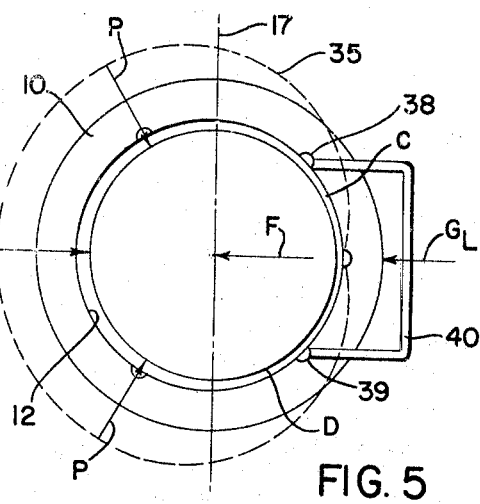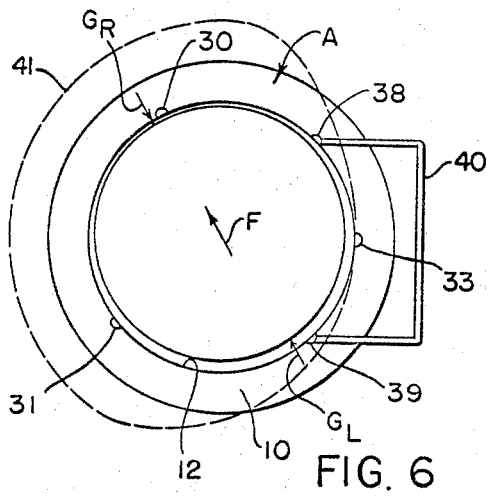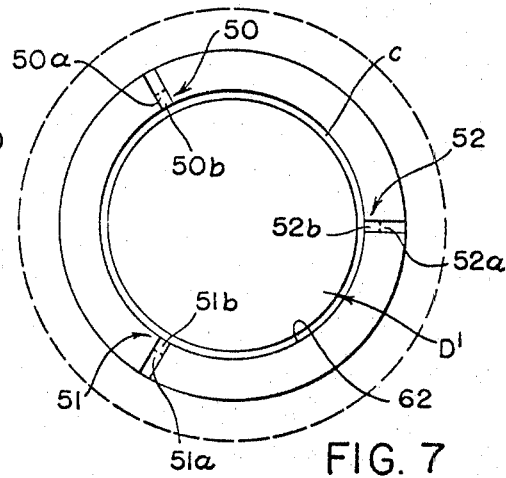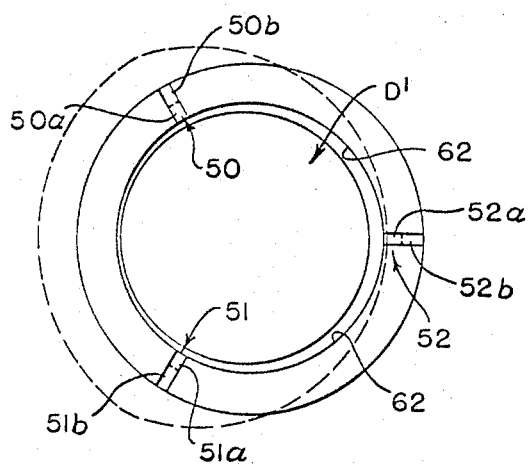

United States Patent Office 3,427,983
Patented Feb. 18, 1969

3,427,983
PRESSURE BALANCED BEARING LOADS
IN HYDRAULIC DEVICES
Robert W. Brundage, 2809 Wakonda Drive, Belnor,
St. Louis, Mo. 63121
Continuation-in-part of application Ser. No. 373,761,
June 9, 1964. This application May 31, 1966, Ser.
No. 553,995
U.S. Cl. 103—126     20 Claims
Int. Cl. F01c 1/04, 21/02

ABSTRACT OF THE DISCLOSURE

A bearing support sytsem for a hydraulic device in which the clearance between the bearing surfaces is greater than normal, i.e., between 0.0015 to 0.010 inch per inch of diameter. Hydraulic fluid is supplied at a pressure to the bearing clearance at a plurality of spaced places. Other places on the bearing surface spaced from the high pressure places are in communication with the low pressure of the hydraulic device, whereby the hydraulic fluid flows through the bearing clearance from the places of high pressure to places of low pressure.

---

This invention pertains to the art of hydraulic devices and more particularly to an arrangement for the pressure balancing of high bearing loads in hydraulic devices.

This application describes in greater detail and claims certain features as shown and described in my copending application, Ser. No. 303,905, filed Aug. 22, 1963, now Patent No. 3,242,703.

The invention is particularly applicable to hydraulic pumps or motors of the internal gear type and will be described with particular reference thereto, although it will be appreciated that the invention has broader applications.

The invention is also particularly applicable to hydraulic devices which operate at relatively high hydraulic pressures wherein the bearing loads reach relatively high values and wherein expedients sometimes employed at low hydraulic pressures are entirely inadequate or non-analogous.

Internal gear type hydraulic pumps or motors of the type to which this invention pertains are normally comprised of: an externally-toothed gear supported on a shaft in turn rotatably supported in bearings in the housing, and an internally-toothed gear surrounding the externally-toothed gear and rotatably supported in a bearing member mounted in or integral with the housing. The gear teeth define a plurality of chambers sealed one from the other and usually one-half of these chambers are at high hydraulic pressure while the other half are at low hydraulic pressure. These high pressures create a radially outward force on the internally-toothed gear member which is transmitted to the housing through the bearing member. These same pressures create a radially inward force on the externally-toothed gear member which is transmitted to the shaft and then through the shaft bearings to the housing. The direction of these two forces is usually 180° apart.

The type of bearing member employed heretofore has depended on the size of the forces to be transmitted. If the forces were low, an ordinary sleeve bearing was employed. All sleeve bearings have a running clearance or "bearing space" between the inwardly facing bearing surface and the outwardly facing surface of the member rotating therein, which running clearance is normally a function of the bearing diameter, being on the order of 0.0010 inch per inch of bearing diameter. This clearance is provided to compensate for normal manufacturing tolerances in out of roundness of the surfaces. This clearance contains a film of lubricant which continuously separates the two surfaces under the forces involved and prevents metal to metal contact.

As the forces on a sleeve bearing increase, they create unit pressures sufficient to break down this lubricating film, resulting in metal to metal contact, and failure of the bearing. When the anticipated pressures are high enough to do this, it has been necessary in the past to resort to roller bearings or to increase the size of the sleeve bearing such that the unit pressures are reduced to that which fluid film lubrication can support without failure. Either of these methods is both expensive and bulky. The present invention deals with this problem.

The problem is complicated by the fact that the direction of the forces imposed on the bearing is often not always known. For example, if the direction of rotation of a hydraulic pump is reversed such that inlet becomes outlet and vice versa, the direction of the forces on the bearings of the pump will normally shift 180°. In the same manner, if the lands separating the manifolds, which are ordinarily positioned on the neutral axis of the gears, are shifted from this normal position to reduce the output volume of the pump, then the direction of the forces on the bearings will also and correspondingly shift.

Further, the amount of the force is not always known, although in a hydraulic pump, it usually varies proportionately to the difference between the high and the low pressures, as well as to the axial length of the gears employed, for example, when gears of a different axial length are substituted to change the volumetric capacity of the pump for the same size housing. The problem in hydraulic motors is often more severe. Here if the high pressure fluid is suddenly admitted to the high pressure or inlet chambers, forces develop in the motor even before rotation begins and before the fluid has had a chance to fill the clearance.

The present invention contemplates using sleeve type bearings and communicating a high hydraulic pressure to low pressure through the bearing clearance or space in such a manner that radial forces applied to the rotating member which must be transmitted through the bearing will be exactly opposed by the resultant of the forces created by the hydraulic pressures in the bearing space. The rotating member will, in effect, be hydrostatically floated in the bearing.

In accordance with the broadest aspect of the present invention, a bearing is provided for a rotating member having a radial load being exerted thereon. The bearing surface has a larger than normal clearance from the rotating member surface so that the member is radially movable within limits within this clearance. Means are provided for feeding high pressure hydraulic fluid into the bearing space so formed at at least two circumferentially spaced apart places. Other means are provided for communicating another place of the bearing space back to low hydraulic pressure. There will thus be a limited but continuous flow of fluid through the bearing space from the high pressure places to the low pressure place with a pressure gradient between the places which varies as a function of the radial position of the rotating member in the bearing space. As the member moves in the clearance, the flow of fluid in the clearance to the low pressure space changes resulting in a pressure gradient in the bearing space exerting inward radial forces substantially all around the member which integrate into a single radial force equal and opposite to the radial load. The rotating member is thus hydrostatically floated in the bearing space. If the external load decreases (or increases), the member moves radially to change the pressure gradient just enough that it remains in a hydrostatically floating condition. In effect radial movement of the member acts as a valve in the fluid flow. This change in the eccentricity of the clearance changes the pressure gradients in the bearing space such that the resultant of the forces created by the pressures will always exactly equal and oppose the applied force.

The arrangement of the places where the high hydraulic pressure is fed into the bearings and where it is communicated back to the sump will vary depending upon the direction of the external radial load to be applied to the rotating member.

If the direction of the radial load is totally unknown, then in accordance with the invention the high pressure fluid is fed into the bearing space at three, equally circumferentially spaced places through three separate flow restricting orifices and both axial ends of the bearing are communicated to the low pressure.

If the radial load is bi-directional and the plane of the load is known, the high pressure fluid is fed through flow restricting orifices into the bearing space at two places, each spaced 90° from the plane of the load and on opposite sides thereof. The bearing space is also communicated to the low pressure at two places each aligned with and on opposite ends of the plane of the forces.

If the radial load is unidirectional and its general direction is known, the high pressure fluid is fed to the bearing space at two places spaced approximately 120° apart or over an arc of 120° and symmetrical with and on the side of the bearing opposite from the load. A third place spaced 120° from each of the two pressure places is communicated to the low pressure. In effect, a wide arc of the bearing is communicated to the high pressure while only a narrow or restricted arc is communicated to low pressure. In this situation the high pressure hydraulic fluid is at such a pressure and the two high pressure places are so located as to create a radial hydraulic force on the member at least greater than the radial load such that the member is forced radially in a direction towards the radial load to an eccentric position in the bearing clearance.

Further, places between the low pressure place and the high pressure places may be intercommunicated to equalize and improve the pressure gradients so that the external unidirectional load may have a direction which shifts through an arc of 120°.

While the source of high pressure fluid may be as desired, in accordance with limited aspects of the invention, the source is the high pressure chambers of the pump or motor which also create the load.

The principal object of the invention is to provide a new and improved bearing arrangement in hydraulic devices wherein the pressure of the hydraulic fluids is used to float the new member rotating in the bearing.

Another object of the invention is the provision of a new and improved bearing arrangement which is quiet in operation for a given size, has a maximum load carrying capacity and which has long life.

Another object of the invention is the provision of a bearing support system of the type described which has low starting friction as well as low running friction.

Still another object of the invention is the provision of a bearing system for hydraulic devices which will effectively support loads of various quantities and directions at the same hydraulic pressures.

The invention may take physical form in certain parts and arrangements of parts preferred embodiments of which will be described in detail in this specification and illustrated in the accompanying drawings wherein:

FIGURE 1 is a side cross-sectional view of an internal gear type hydraulic motor illustrating a preferred embodiment of the invention;

FIGURES 2 and 3 are cross-sectional views of FIGURE 1 taken approximately on the line 2—2, and 3—3 thereof respectively;

FIGURE 4 is a schematic view of the bearing and the rotating member therein with the bearing clearances greatly exaggerated and showing a typical pressure gradient pattern obtained during operation;

FIGURE 5 is a view similar to FIGURE 4 but showing the change in the pressure gradients due to a change in the force tending to move the rotating member sidewardly in the bearing clearance;

FIGURE 6 is a view similar to FIGURE 4 but showing the pressure gradients when a lesser force is applied to the rotating member at an angle to the horizontal;

FIGURE 7 is a view similar to FIGURE 4 but showing an alternate embodiment of the invention used when the direction of the force is unknown;

FIGURE 8 is a view similar to FIGURE 7 showing the pressure gradients when a horizontal force to the left is imposed on the rotating member;

Figure 1:
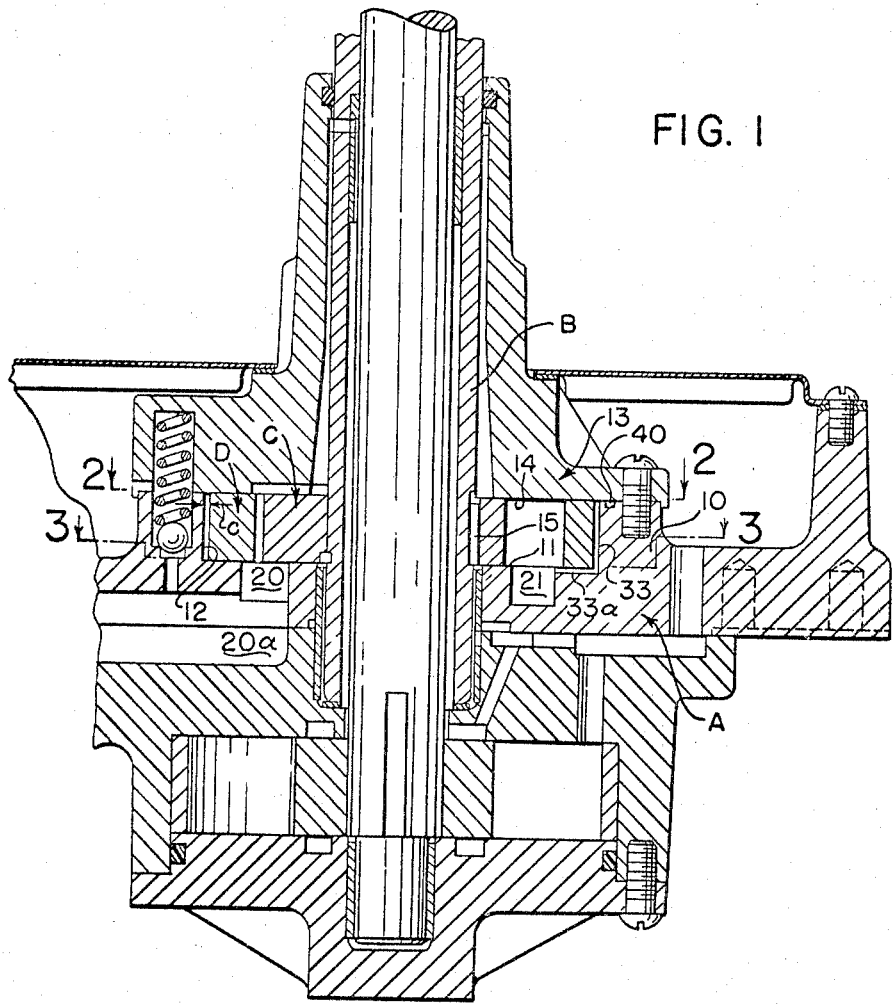

Referring now to the drawings wherein the showings are for the purpose of illustrating preferred embodiments of the invention only and not for the purposes of limiting same, FIGURES 1 and 3 show an internal gear type motor comprised generally of a housing A, a driven shaft B, an externally toothed gear C keyed to the shaft B and an internally toothed gear D surrounding the externally toothed gear and rotatable therewith.

The housing A shown is comprised generally of a main housing member 10 having an upwardly facing cylindrical recess defined by a lower flat surface 11 and a cylindrical surface 12. A cover plate 13 forms the other part of the housing and extends across the recess and has a downwardly facing surface 14 parallel with the surface 11.

The externally toothed gear C is keyed for rotation to the shaft B by means of a key 15. The internally toothed ring gear D is mounted for rotation in the cylindrical surface 12, on an axis spaced from the axis of rotation of the gear C and thus the shaft B.

The ring gear D has one or more teeth than the gear C, and the teeth are in sliding sealing engagement to form a plurality of chambers 16H, 16L, which progressively increase and decrease in volume as the gears rotate. These gears have a neutral axis 17 as is shown in FIGURE 2 defined by the maximum and minimum volume points of the chambers.

The upper surface 14 is in sliding sealing relation with the upper surfaces of the gears C, D. In a like manner, the lower surface 11 of the recess is in sliding sealing engagement with the lower surfaces of the gears C, D, and has arcuate extending inlet and outlet manifold ports 20, 21 respectively, formed therein spaced from the axis of rotation so as to communicate with the increasing and decreasing volume chambers of the gears. The inlet manifold port 20 has a supply passage 20a extending downwardly to communicate with a source of high pressure fluid (not shown).

Likewise the outlet manifold port 21 has a passage 21a, extending downwardly to communicate with the sump (not shown).

The surface 11 between the arcuate ends of the manifold ports 20, 21 functions as the lands of the motor. These lands have an arcuate width at least equal to the arcuate width of the gear chambers 16H, 16L at their maximum arcuate width to prevent communication from one manifold port 20 to the other manifold port 21 through the chambers.

The cylindrical surface 12 functions as a sleeve-type bearing for the internally toothed ring gear and, in accordance with the invention, has a diameter greater than the diameter of the external surface of the ring gear D by an amount greater than normal to provide a clearance c or bearing space which is filled with a lubricant which in the present case is the hydraulic fluid used to energize the motor. Also the surfaces 11, 14 sealingly engage the upper and lower surfaces of gear D thus closing the axial ends of the bearing space c.

In normal sleeve-type bearings, the radial clearance normally is approximately 0.0010 inch per inch of diameter but in accordance with the present invention, the clearance is somewhat greater than this, namely 0.0015 to 0.010 inch per inch of diameter; 0.004 is preferred for a motor or pump of the type shown having a diameter of 2½ inches which compensates for distortions of the gear D under high pressures. Thus, the ring gear is free within limits to move radially within its supporting bearing under the effect of radial forces thereon.

In the embodiment of the invention shown, the chambers 16H, which are on the left side of the neutral axis 17 as viewed in FIGURE 2, are all at the high hydraulic pressures and these pressures exert a radially outward force over the one-half of the entire inner surface of the ring gear D. All of these forces may be integrated into a single large radially outward load or force F approximately perpendicular to and on the high pressure side of the neutral axis 17. In the motor shown, this force F is unidirectional and its direction is known. This force F is transmitted to the housing through the film of lubricating oil in the bearing space c and would create a unit bearing pressure inversely proportional to the diameter and length of the bearing. In hydraulic devices of the type to which this invention pertains, and in the absence of the invention, the force F and the unit pressure which it creates may reach very high values sufficient to rupture the lubricating film in the bearing space, in which event, metal-to-metal contact results and bearing failure will soon follow.

Further in the case of a motor, the amount of fluid in the clearance after the motor has been idle for a while, may be minimal such that if high pressure fluid were suddenly admitted to the high pressure chambers, the instantaneous radial force resulting could cause metal-to-metal contact and failure.

In accordance with the invention, an opposing hydraulic force is created on the outer surface of the ring gear in opposition to and greater than the force F so as to cause the member to move in a direction opposite to the force F. This is done by communicating spaced places of the bearing space c to the high hydraulic pressure and other places to the low or return hydraulic pressure. The manner of physically locating these places and communicating them to the high and low pressures may take a number of different forms dependent on the anticipated direction of the force F. In the preferred embodiment shown in FIGURE 2, the force F is to the right and generally perpendicular to the neutral axis 17 and the places are located by providing elementally extending grooves in the surface 12 and communicating these grooves at their ends to the respective pressures by passages in the housing.

Thus, the cylindrical surface 12 has a pair of high pressure grooves 30, 31 symmetrically located on the high pressure chamber side of the neutral axis 17 and spaced apart approximately 120°. Each groove 30, 31 communicates with the inlet or high pressure port 20 through grooves 30a, 31a respectively in the surface 11. Thus, hydraulic fluid at high pressure is fed to the bearing space c at two points spaced 60° from the perpendicular to the neutral axis, i.e., the line of action of force F, and across the entire axial length of the surface 12.

The low pressure place is located by a groove 33 located adjacent the midpoint of the low pressure chamber side of the neutral axis 17 and this groove 33 communicates with the discharge manifold 21 through a groove 33a in the surface 11.

In operation, the hydraulic fluid is restricted against axial flow by the engagement of the surfaces 11, 14 with the surfaces of the gears C, D. Fluid flows clockwise through the bearing clearance c from groove 30 to groove 33 and counterclockwise from groove 31 to groove 33. Because of the restriction to the flow of this fluid by the narrow clearance of the bearing space c, the pressure of the hydraulic fluid in the bearing clearance c will drop from a maximum indicated by the vector P at the grooves 30, 31 to zero at the groove 33 with a gradually decreasing pressure between these two points. In the arc between grooves 30, 31, the pressure will be the same as that at the grooves 30, 31.

The pressure of this hydraulic fluid creates radially inward forces over the entire outer surface of the ring gear D, the force at any one point being directly proportional to the actual pressure at that point.

In accordance with the invention, these hydraulic forces on the ring gear D on the left side of the neutral axis 17 integrate into a single large force $G_R$ greater than the force F. Thus the ring gear D is moved to the right in the bearing clearance c making the bearing clearance eccentric in a direction opposite to the direction of the force F. The effect of the ring gear D moving to the right as is shown in FIGURE 4 is to restrict the flow of fluid into groove 33 with the result that the hydraulic pressures on the side of the ring gear D to the right of the neutral axis 17 increase. These hydraulic pressures can be integrated into a single force $G_L$ to the left. These forces add vectorially with the force $G_L$ varying due to the movement of the ring gear D in the bearing clearance c, so that the force $G_L$ plus force F will exactly equal and be opposite to the force $G_R$.

Curve 35 of FIGURE 4 shows the normal pressure gradient which varies from a maximum through the arc between the grooves 30, 31 to zero at the groove 33. FIGURE 5 shows the effect on the shape of this curve 35 when the force F is increased. In this instance, the force $G_R$ remains approximately the same. However, the force F moves the ring gear D to the left and the bearing clearance to the right of the neutral axis 17 is increased resulting in a greater flow of fluid through the bearing clearance c and a reduction in the hydraulic pressures against the side of the ring gear D to the right of the neutral axis 17. The effect is that force $G_L$ is reduced in an amount equal to the amount of increase in the force F.

As hereinbefore indicated, the ring gear D will be hydrostatically floated in the bearing clearance c and within the load limitations of the device, the ring gear D will always be eccentric in the bearing clearance in a direction opposite to the load or force F on the ring gear D or the rotating member.

The above description has been for a force F which is perpendicular to the neutral axis 17. If the force F as viewed in FIGURE 6 is at an angle of 30° to the neutral axis, the pressure gradients as indicated by curve 37 change so that the force $G_R$ which shifts so as to be aligned with the force F remains greater than the force F and the force $G_L$ also shifts in such a manner that the force $G_R$ is equal and opposite to the force F plus the force $G_L$.

Also in accordance with the invention, places on the bearing between the high pressure grooves 30, 31 and the low pressure groove 33 are intercommunicated to provide a pressure gradient in the clearance as the direction of the force F shifts. In the embodiment of the invention shown, these places are in the form of a pair of grooves 38, 39 in the surface 12 and spaced approximately 30° from the neutral axis on the low pressure side of the neutral axis. These grooves 38, 39 are intercommunicated by a groove 40 in the surface 14 radially outwardly of the cylindrical surface 12. The use of such a groove will change the pressure gradient from that which would prevail as shown by the broken line 41 in FIGURE 6. A somewhat improved balancing action results.

The invention is equally applicable to where the direction of the force is not known. In accordance with the vention and as shown more particularly in FIGURES 7 and 8, the high pressure is fed to the bearing space at three points 50, 51 and 52 spaced 120° apart through flow restricting orifices 50a, 51a and 52a.

Figure 8A:
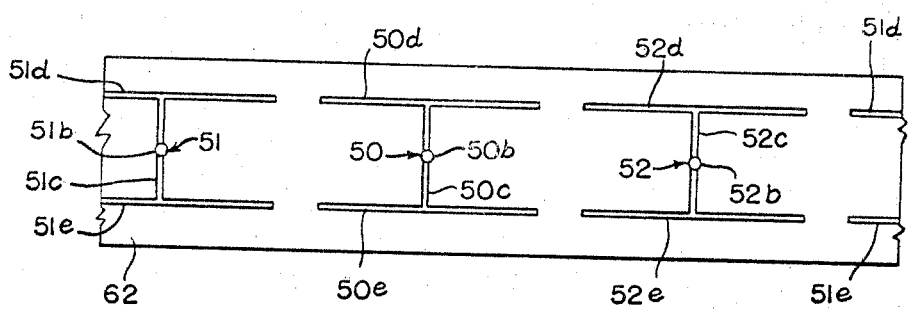
FIGURE 8a is a plan view of the bearing surface of FIGURES 7 and 8.

FIGURE 8a shows a plan view of a preferred arrangement for communicating the high pressures to the bearing space. Thus, the points are in the form of radial passages 50b, 51b and 52b spaced 120° apart and located on the axial mid-plane of the bearing surface 62. The passage 50b communicates with an elementally extending groove 50c in the bearing surface 62 which in turn communicates with the mid-point of a pair of circumferentially extending grooves 50d, 50e, each located adjacent to but spaced from the axial ends of the bearing surface 62. These grooves 50d, 50e extend circumferentially for approximately 100° so that their ends are spaced approximately 20° from the ends of the adjacent circumferentially extending grooves 51d, 51e and 52d and 52e, all respectively.

The diameter or length or both of the radial passages 50b, 51b, 52b may be so restricted or elongated as to form a restriction or orifice to the flow of fluid therethrough, which is greater than the restriction of the normal bearing clearance c to the axial ends of the bearing surface 62 where the fluid is then communicated to the low pressure or the sump.

In operation, there is a continuous flow of fluid from the high pressure source, not shown, through the three restricting passages or orifices 50b, 51b, 52b, and the bearing clearance c to the sump. This flow creates a pressure drop across the passages and the clearance c with the drop across the orifice varying as the clearance varies. Thus, if a force moves member D' toward opening 50, the pressure drop across the orifice 50 decreases raising the pressure in grooves 50b and 50c and decreasing the pressures in the opposite grooves 51b, 51c and 52b and 52c. The change in the pressures in the bearing space c results in a change in the force pattern which acts to hydraulically balance the member D' in the bearing space c.

Figure 9:
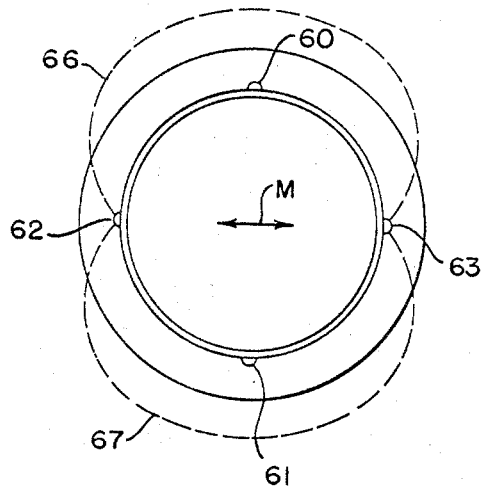
FIGURE 9 is a view somewhat similar to FIGURE 4 but showing an alternative embodiment of the invention for use when the direction of the force is horizontal and bi-directional; and, FIGURE 10 shows the pressure gradients when a horizontal force to the left is imposed on the rotating member.
Figure 10:
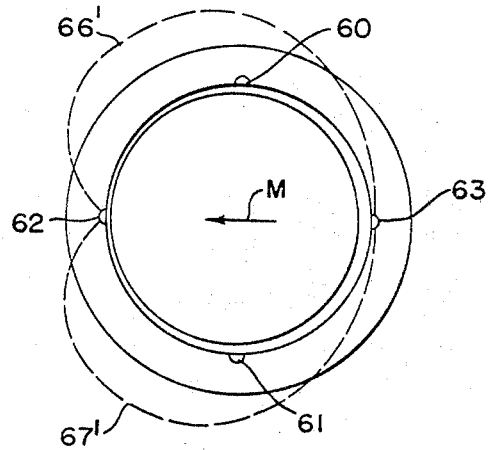

FIGURES 9 and 10 show the application of the invention to where the plane of the forces is known but the direction is reversible. In the embodiment shown in FIGURE 9, the force M is shown as being horizontal. In such event, the bearing surface is provided with grooves 60, 61 communicated with the high fluid pressure which grooves are located on the plane perpendicular to the direction of the force. The bearing space is communicated through grooves 62, 63 located on the plane of the force with the suction or return. Line 66 and 67 shows the pressure gradients when the force M is zero. If the force M be assumed to the left as is shown in FIGURE 10, lines 66' and 67' show the pressure gradients caused by the movement of the member to the left, it being noted that the pressure gradient from the grooves 60 and 61 to the groove 63 is relatively steep so that the force created by the pressures to the right of the plane through the grooves 60, 61 is reduced. On the other hand, the pressure gradient from the grooves 60 and 61 to the groove 62 is reduced so that the integrated force of these pressures is larger and can resist the force M to balance the member in its bearing.

It is known to feed the high hydraulic pressure of a pump to the side of the bearing where the load must be transmitted. However, no effort was ever made to control the place where the fluid drained away. The problem has been that the forces created by the pressures in the bearing space sometimes became so much larger than the load to be transmitted as to move the shaft or member supported in the bearing against the opposite side of the bearing with sufficient force to rupture the lubricating film there and cause failure of the bearing.

The present invention, by increasing the clearance and controlling the point of exodus of the fluid from the bearing, overcomes this difficulty.

This application is a continuation-in-part of my copending application Ser. No. 373,761, filed June 9, 1964, now abandoned, which is a continuation-in-part of my copending application Ser. No. 175,722, filed Feb. 26, 1962, now Patent No. 3,188,969, which in turn is a division of the application which resulted in U.S. Patent No. 3,034,446, issued May 15, 1962.

It will thus be seen that an arrangement has been shown for hydraulically balancing the member within a sleeve-type bearing against any combination of forces which may be applied to the member so that sleeve bearings may be employed for the purpose of resisting heavy radial loads on a member rotating therein without danger of the fluid film being ruptured and failure of the bearing occurring.

The present invention has been described in connection with certain structural embodiments; however, it is appreciated that the invention is not limited by these embodiments and various changes may be made without departing from the intended spirit and scope of the present invention as defined by the appended claims.

Having thus described my invention, I claim:

1. In a bearing support system for a hydraulic device, comprised of a stationary bearing member having a radially inwardly facing cylindrical bearing surface and a rotating member in said bearing member having a radially outwardly facing cylindrical surface and having radial loads imposed thereon by the hydraulic fluid under pressure of said device, the improvement which comprises: the clearance between said surfaces being greater than normal, i.e., between 0.0015 to 0.010 inch per inch of diameter, means for supplying the hydraulic fluid at a pressure to the bearing clearance at a plurality of spaced places and other means communicating other places in the bearing surface spaced from said high pressure places with the low pressure of said device, said other places having a limited arcuate extent.

2. The improvement of claim 1 which comprises: supplying the hydraulic fluid to said bearing surface at three places spaced 120° and means communicating the axial ends of said bearing surfaces to low pressure.

3. The improvement of claim 1 which comprises: communicating the hydraulic fluid under pressure to said bearing surface at two places spaced 180° and means communicating other places of limited arcuate extent on the bearing surface spaced 90° from the high pressure places with the low pressure of said device.

4. The improvement of claim 1 which comprises: means communicating the hydraulic fluid under pressure to said bearing surface at two places spaced from between 10°–170° and means communicating a third circumferentially narrow space equally spaced from each of said first mentioned places with the low pressure of said device.

5. The improvement of claim 4 wherein means intercommunicate circumferentially narrow places on said bearing between each of the high pressure places and the low pressure place.

6. The improvement of claim 5 wherein said fluid has a pressure sufficient to create a force on the rotating member greater than the radial load.

7. In a bearing support system for a hydraulic device, comprised of a stationary bearing member having a radially inwardly facing cylindrical bearing surface and a rotating member in said bearing member having a radially outwardly facing cylindrical surface and having radial loads imposed thereon by the hydraulic fluid under pressure of said device, the improvement which comprises: said surfaces having a greater than normal clearance therebetween of from 0.0015 to 0.010 inch per inch of diameter, said stationary bearing surface having three recesses therein spaced 120° apart, means including an orifice communicating each of said recesses with the high pressure hydraulic fluid, and means communicating the axial ends of said bearing surfaces with the low pressure of said device.

8. The improvement of claim 7 wherein said recesses are circumferentially extending grooves with the ends of said grooves being circumferentially spaced.

9. The improvement of claim 8 wherein said recesses are circumferentially extending grooves with the ends circumferentially spaced.

10. In a bearing support system for a hydraulic device, comprised of a stationary bearing member having a radially inwardly facing cylindrical bearing surface of a measurable diameter, and a rotating member in said bearing member having a radially outwardly facing cylindrical surface and having radial loads imposed thereon by the hydraulic fluid under pressure of said device, the improvement which comprises: said surfaces having a greater than normal clearance therebetween of from 0.0015 to 0.010 inch per inch of diameter, said stationary bearing member having a pair of recesses therein spaced approximately 120° apart, means communicating the high pressure hydraulic fluid to said recesses, and a third circumferentially narrow recess spaced approximately 120° from the first mentioned recesses, and means communicating said third recess with the low pressure of said device.

11. The improvement of claim 10 wherein said bearing surface has two recesses intermediate said high pressure recesses and the low pressure recess and means intercommunicating said last mentioned recesses.

12. In a bearing support system for a hydraulic device, comprised of a stationary bearing member having a radially inwardly facing cylindrical bearing surface of a measurable diameter, and a rotating member in said bearing member having a radially outwardly facing cylindrical surface and having radial loads imposed thereon by the hydraulic fluid under pressure of said device, the improvement which comprises: said surfaces having greater than normal clearance of from 0.0015 to 0.010 inch per inch of diameter, said bearing surface having two recesses spaced 180° apart, means communicating the high pressure hydraulic fluid to said recesses, said bearing surface having two other circumferentially narrow recesses spaced 90° from the first two mentioned recesses and means communicating the last two mentioned recesses with the low pressure of said device.

13. In a hydraulic device, comprised of rotatably supported externally-toothed and internally-toothed gear members defining a plurality of increasing and decreasing volume chambers, generally one-half of said chambers being at high hydraulic pressure which exerts a radial outward force on said internally-toothed gear member, the other half being at low hydraulic pressure, a bearing member having a bearing surface rotatably supporting said internally toothed gear member, a pair of axially extending grooves in said bearing surface located approximately 120° apart and symmetrical about the anticipated line of action of said force, means communicating the high pressure hydraulic fluid with said grooves, said bearing surface having another axially extending circumferentially narrow groove spaced equally from the first two mentioned grooves, and means communicating said last mentioned groove with the low hydraulic pressure.

14. The improvement of claim 13 wherein said bearing surface has an additional pair of axially extending grooves, one located between each of said high pressure grooves and said low pressure groove, and means inter-communicating said additional pair of grooves.

15. In a bearing arrangement comprised of a cylindrical bearing surface defining a bearing opening, a member rotatable in said opening and having a diameter less than said bearing surface diameter to provide a bearing clearance, a lubricating fluid in said bearing clearance, said member having external forces exerted thereon which are to be transmitted to said bearing surface through said lubricant, a source of high pressure fluid capable of serving as a lubricant, the improvement of which comprises: said bearing clearance being greater than normal from 0.0015 to 0.0050 inch per inch of bearing surface diameter, means communicating the high pressure fluid to three places on said bearing surface spaced 120° apart, other means axially spaced relative to said three points and symmetrically positioned relative thereto communicating with low pressure whereby the high pressure fluid flows from said three points through said bearing space to said low pressure and flow restricting means in series with said means communicating the high pressure fluid to said three places.

16. In a bearing arrangement comprised of a cylindrical bearing surface defining a bearing opening, a member rotatable in said opening and having a diameter less than said bearing surface diameter to provide a bearing clearance, a lubricating fluid in said bearing clearance, said member having external forces exerted thereon which are to be transmitted to said bearing surface through said lubricant, a source of high pressure fluid capable of serving as a lubricant, the improvement which comprises said bearing clearance being from 0.0015 to 0.0050 inch per inch of bearing surface diameter, means communicating the high pressure fluid to each of three places on said bearing surface spaced 120° apart and spaced from the axial ends of said bearing surface and other means communicating the axial ends of said bearing surface to low pressure fluid.

17. The improvement of claim 16 wherein said places are comprised of circumferentially extending grooves in said bearing surface with the ends of adjacent grooves being circumferentially spaced from each other.

18. A bearing arrangement comprised of a cylindrical bearing surface defining a bearing opening, a member rotatable in said opening and having a diameter less than said bearing surface to provide a bearing clearance filled with a lubricant, said member having external radial forces exerted thereon of a predetermined direction, a source of high pressure fluid, the improvement which comprises: said bearing clearance being greater than normal from 0.0015 to 0.010 inch per inch of diameter, means communicating the high pressure fluid to two places on said bearing surface spaced 120° apart and generally symmetrical relative to the line of action of said radial force, another means spaced 120° from said two places communicating a third space with the low pressure hydraulic fluid whereby hydraulic fluid flows through said bearing space circumferentially from the high pressure places to the low pressure places.

19. The improvement of claim 13 wherein said pressure and the external diameter of said internally toothed gear are such that the hydraulic forces developed on the outside of said grear are greater than the radial outward force.

20. In a hydraulic device:
(a) A cyclindrical bearing member;
(b) A cylindrical member rotatable in said bearing members;
(c) A bearing clearance between said members;
(d) One of said members being subjected to hydraulic fluid under high pressure which creates a first radial force thereon tending to relatively move said members radially towards each other at a first place on the line of said force whereby to change the eccentricity of said bearing clearance;
(e) The improvement which comprises: means communicating said high pressure hydraulic fluid over a circumferentially long arc of said clearance adjacent said first place whereby to create a second radial force opposite to said first radial force, the length of said arc being such that said second force is at least greater than said first force whereby said members are moved radially towards each other at a second place generally diametrically opposite from said first place; and,
(f) Means communicating a circumferentially narrow arc of said clearance to low hydraulic pressure, said arc being adjacent said second place and the ends of said narrow arc being generally equally spaced from the ends of said long arc whereby as said members are moved relatively towards each other at said second place, flow of hydraulic fluid to said narrow arc is restricted adjacent the ends of said arc and the hydraulic pressures in the bearing clearance create hydraulic forces equal and opposite to the first radial force.

References Cited

UNITED STATES PATENTS

| | | | |
|---|---|---|---|
| 1,372,576 | 3/1921 | Tullmann | 103—126 |
| 1,379,587 | 5/1921 | Fisher | 103—126 |
| 1,459,552 | 6/1923 | Rathman | 103—126 |
| 1,970,146 | 8/1934 | Hill | 103—126 |
| 2,076,664 | 4/1937 | Nichols | 103—126 |
| 2,319,374 | 5/1943 | Ungar | 103—126 |
| 2,746,394 | 5/1956 | Dolza et al. | 103—126 |
| 2,918,877 | 12/1959 | Woodcock | 103—126 |
| 2,955,536 | 10/1960 | Gaubatz | 103—126 |
| 3,188,969 | 6/1965 | Brundage | 103—126 |
| 3,242,703 | 3/1966 | Brundage | 68—23 |

DONLEY J. STOCKING, *Primary Examiner.*

W. J. GOODLIN, *Assistant Examiner.*

U.S. Cl. X.R.

230—207; 308—122, 160